United States Patent
Maruyama et al.

(10) Patent No.: US 7,029,782 B2
(45) Date of Patent: Apr. 18, 2006

(54) ELECTROCHEMICAL HYDROGEN FLOW RATE CONTROL SYSTEM

(75) Inventors: Ryuichiro Maruyama, Kanagawa (JP);
Masafumi Ata, Kanagawa (JP);
Makoto Oogane, Kanagawa (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 10/420,251

(22) Filed: Apr. 22, 2003

(65) Prior Publication Data
US 2003/0232225 A1  Dec. 18, 2003

(30) Foreign Application Priority Data
Apr. 22, 2002  (JP) ............ P2002-118745

(51) Int. Cl.
*H01M 8/04* (2006.01)
*H01M 4/96* (2006.01)
*C01B 31/00* (2006.01)

(52) U.S. Cl. ............ 429/33; 429/22; 429/30; 429/41; 429/46; 423/445 R

(58) Field of Classification Search ............ 429/33, 429/22, 30, 41, 46; 423/445 B, 445 R
See application file for complete search history.

(56) References Cited

U.S. PATENT DOCUMENTS

| | | | |
|---|---|---|---|
| 6,495,290 B1 | 12/2002 | Hinokuma et al. | |
| 6,635,377 B1 | 10/2003 | Hinokuma | |
| 2004/0140201 A1* | 7/2004 | Horikawa | 204/242 |
| 2004/0253494 A1* | 12/2004 | Maruyama et al. | 429/21 |

FOREIGN PATENT DOCUMENTS

WO  WO 03/025251 A1 *  3/2003

OTHER PUBLICATIONS

H.W. Kroto et al., *C60: Buckminsterfullerene*, Nov. 1985, Nature v. 318, pp. 162-163.
Long Y. Chiang et al., *Multi-hydroxy Additions onto $C_{60}$ Fullerene Molecules*, J. Chem. Soc., 1992 pp. 1791-1793.
Long Y. Chiang et al., *Efficient Synthesis of Polyhydroxylated Fullerene Derivatives via Hydrolysis of Polycyclosulfated Precursors*, American Chem. Society, 1994, pp. 3960-3969.

* cited by examiner

Primary Examiner—Patrick Joseph Ryan
Assistant Examiner—Angela J. Martin
(74) Attorney, Agent, or Firm—Bell, Boyd & Lloyd LLC

(57) ABSTRACT

An electrochemical hydrogen flow rate control system is provided. The system has an electrochemical cell and a hydrogen flow rate control unit. The electrochemical cell includes a first electrode for generating protons ($H^+$), a second electrode for converting the protons generated by said first electrode into hydrogen gas, and a proton conductive solid electrolyte membrane held between said first and second electrodes. The hydrogen flow rate control unit is adapted to generate a specific amount of hydrogen gas on the second electrode side. The proton conductive solid electrolyte membrane is made from a fullerene derivative obtained by introducing proton dissociative groups in carbon atoms of fullerene molecules. Such a control system is operable even in a non-humidified atmosphere and at room temperature and is configurable as lightweight and compact in system design.

10 Claims, 6 Drawing Sheets

$C_{60}(OH)_{12}$

ELECTROCHEMICAL HYDROGEN FLOW RATE CONTROL SYSTEM

CROSS REFERENCE TO RELATED APPLICATIONS

This patent application claims priority to Japanese Patent Document No. P2002-118745 filed on Apr. 22, 2002, the disclosure of which is herein incorporated by reference.

BACKGROUND OF THE INVENTION

The present invention relates to an electrochemical system. More specifically, the present invention relates to electrochemical hydrogen flow rate control system.

Fuel cells that employ hydrogen gas as a fuel have known and used industrial applications. Such fuel cells are expected to be more developed in future as power sources capable of generating energies with less environmental load or impact. From a technical view for widespread use of fuel cells, one concern is how to effectively control hydrogen gas.

It is anticipated that hydrogen gas will be widely spread to societies in the future, and more specifically, hydrogen gas will be directly distributed to home, and thus readily and directly available at home. In general, floating type flow meters are now often used to control the flow rate of hydrogen gas. Such a floating type flow meter, however, is disadvantageous in causing a large error. Accordingly, it becomes important to develop a more accurate hydrogen flow rate control system.

On the other hand, a method of electrically controlling the flow rate of hydrogen gas has been adopted, wherein an error of a floating type flow rate control system is electrically detected, and the flow rate of hydrogen gas is controlled while the detected error was finely adjusted. Such a method, however, has a problem that the control system becomes too large and complex, and therefore, from the viewpoint of personal use, that is, to allow a user to readily control the flow rate of hydrogen gas, the control system is undesirable.

To solve the above-described problem, there has been proposed a method of converting hydrogen gas into protons by making use of a proton conductor, thereby controlling an amount of hydrogen gas as the amount of a current. With this method, it is possible to more accurately control the flow rate of hydrogen gas.

The conventional proton conductor is represented by a proton (hydrogen positive ion) exchange membrane mainly made from polytetrafluoroethylene or the like, which is operable at a temperature near room temperature. For example, a solid polymer proton conductive membrane is commercially available from Du Pont in the trade name of NAFION.

FIG. 6 is an enlarged sectional view of a related art hydrogen gas control system using a solid polymer proton conductive membrane as a proton conductor. As shown in FIG. 6, reference numeral 51 denotes a solid polymer proton conductive membrane, for example, NAFION having a thickness of about 0.2 mm, 52 is a gas diffusive anode electrode on which a catalyst such as platinum is supported, 53 is a gas diffusive cathode electrode on which the same catalyst as that for the anode electrode 52 is supported, 54 is a gas flow passage on the anode 52 side, 55 is a gas flow passage on the cathode 53 side, 56 is a metal current collector on the anode 52 side, and 57 is a metal current collector on the cathode 53 side.

The operational principle of this system will be hereinafter described. When hydrogen gas is supplied to the gas flow passage 54 on the gas diffusive electrode 52 side, it loses electrons on the gas diffusive electrode 52, to generate $H_3O^+$ ions in accordance with the reaction expressed by the following formula (1):

$$H_2 + 2H_2O \rightarrow 2e^- + 2H_3O^+ \tag{1}$$

The $H_3O^+$ ions thus generated migrate, together with moisture in the solid polymer proton conductive membrane 51, to the other gas diffusive electrode 53 by a drive force given by a voltage, and receive electrons on the gas diffusive electrode 53, to be converted again to hydrogen gas in accordance with the reaction expressed by the following formula (2):

$$2e^- + 2H_3O^+ \rightarrow H_2 + 2H_2O \tag{2}$$

The hydrogen gas generated on the gas diffusive electrode 53 does not pass through the solid polymer proton conductive membrane 51. The migration force of ions given by the voltage is large. The metal current collectors 56 and 57 function to apply a voltage between the gas diffusive electrodes 52 and 53, and also function to mechanically reinforce the gas diffusive electrodes 52 and 53 and the solid polymer proton conductive membrane 51.

According to the solid polymer proton conductive membrane 51, for example, NAFION used for the related art electrochemical hydrogen gas flow rate control system as shown in FIG. 6, since the operating temperature at which a sufficient proton conductivity can be obtained is in a range of 80 to 100° C., there does not occur any inconvenience due to the operating temperature.

The solid polymer proton conductive membrane 51, however, has problems that a sufficient amount of moisture must be supplied to the membrane 51 to sustain effective proton conductivity, and that since moisture migrates along with migration of $H_3O^+$ ions in the membrane, it is required to supplement moisture even to the anode 52. As a result, the related art hydrogen gas flow rate control system must be provided with a large-sized humidifier, which leads to enlargement and complexity of the system.

In addition to the problem associated with the need of supplementing a large amount of moisture to the control system, the related art control system has a further problem that since moisture is generated on the cathode 53 side when hydrogen gas is generated on the cathode 53 side as shown in the formula (2), the hydrogen gas generated on the cathode 53 side contains a large amount of the moisture, with a result that it is difficult to control the amount of hydrogen gas to be generated.

A need, therefore, exists to provide improved electrochemical systems, particularly electrochemical systems that hydrogen-powered fuel cells.

SUMMARY OF THE INVENTION

The present invention generally relates to electrochemical systems. More specifically, the present invention can provide an electrochemical hydrogen flow rate control system which is operable even in a non-humidified atmosphere and at room temperature. The systems of the present invention are light-weight, compact and less complex in system design.

According to an embodiment of the present invention, there is provided an electrochemical hydrogen flow rate control system that has an electrochemical cell and a hydrogen flow rate control unit. The electrochemical cell includes a first electrode for generating protons (H+), a second electrode for converting the protons generated by the first electrode into hydrogen gas, and a proton conductive solid electrolyte membrane held between the first and second electrodes. The hydrogen flow rate control unit is adapted to generate a specific amount of hydrogen gas on the second electrode side. The control system provides that the proton conductive solid electrolyte membrane is made from a fullerene derivative obtained by introducing proton dissociative groups in carbon atoms of fullerene molecules.

The term "proton dissociative groups" means functional groups from which protons are dissociated, and the term "dissociation of protons" means that protons are released from functional groups by ionization.

According to an embodiment of the present invention, the proton conductive solid electrolyte membrane is composed of a fullerene derivative obtained by introducing proton dissociative groups to carbon atoms of fullerene molecules and the control system has the hydrogen flow rate control unit. In this regard, at the time of operating the control system, the system does not require a supplement of moisture unlike known systems that use a solid polymer proton conductive membrane, such as NAFION, and therefore, even in a dry atmosphere and at room temperature, the system of the present invention can accurately control the flow rate of hydrogen gas due to the good and effective proton conductivity of the proton conductive solid electrolyte membrane. As a result, the system can eliminate the need of a humidifier or other like moisture-generating device, and thus can provide a lightweight and compact system design.

Since the control system can be operated in a dry atmosphere without the need of any humidification, it is possible to prolong the service life of the proton conductive solid electrolyte membrane made from the fullerene derivative.

In addition to the advantage associated with elimination of the need of any humidification, the control system is further advantageous in that since the hydrogen gas generated on the cathode side contains little moisture, it is possible to easily and accurately control the generated amount of hydrogen gas by the hydrogen flow rate control unit.

According to an embodiment of the electrochemical hydrogen flow rate control system of the present invention, preferably, when a hydrogen gas is supplied to a surface side, not provided with the proton conductive solid electrolyte membrane, of the first electrode, a specific amount of current is applied between the first and second electrodes by the hydrogen flow rate control unit, whereby the hydrogen gas is electrolyzed into the protons in an amount corresponding to the specific amount of current on the first electrode side, and thus the protons are allowed to migrate to the second electrode through the proton conductive solid electrolyte membrane and are converted again into hydrogen gas on the second electrode side, thus obtaining a specific amount of the hydrogen gas on the second electrode side.

According to an embodiment of the electrochemical hydrogen flow rate control system of the present invention, when a voltage is applied to the proton conductive solid electrolyte membrane, the protons generated on the first electrode side migrate through the proton conductive solid electrolyte membrane in the direction reversed to the voltage applying direction, and thus can be converted again into hydrogen gas on the surface of the proton conductive solid electrolyte membrane on the second electrode side.

The amount of the hydrogen thus generated is determined by the amount of a current flowing in the proton conductive solid electrolyte membrane, and the amount of a current is expressed by the following equation (3). As a result, the generated amount (flow rate) of the hydrogen gas can be controlled by controlling the amount of a current flowing in the proton conductive solid electrolyte membrane by using the hydrogen flow rate control unit.

$$E = E_o + (RT/2F) \times \ln(P2/P1) + ir \quad (3)$$

where $E_o$ is an ionization potential of hydrogen gas, R is a gas constant, T is a temperature, F is a Farady constant, P1 is a hydrogen gas pressure on the first electrode side, P2 is a hydrogen gas pressure on the second electrode side, i is a current, and r is an electric resistance.

With respect to the voltage between both the electrodes in the equation (3), the first term on the right side is the ionization potential $E_o$ which is nearly equal to 0 V; the second term on the right side is a so-called Nernst applied voltage which is determined by the gas pressures applied to both the electrodes, which terms becomes 0 V when each of the gas pressures on both the electrodes is 1 atm; and the third term on the right side is mainly dependent on a film resistance, which term is most of the total voltage.

For example, the flow rate of hydrogen (S (ml/min)) can be calculated on the basis of an equation of $m = I \times t/2F$ (refer to equation (9) described in detail below). In the above equation, m is a theoretical molar amount of hydrogen gas, I is a current (iA), t is a time (s), and F is the Farady constant. The Farady constant is expressed by F=96500 C/mol where C is an electric capacitance when a current of 1 A flows for one second (1C=1 A·s). Accordingly, 2F=193000×A·s/mol. In addition, one mole of hydrogen is 22400 ml.

From the above equation ($m = I \times t/2F$), the theoretical molar amount (m) of hydrogen gas per unit time (one second) is calculated as follows:

$$m = I/2F = iA/(193000 \times A/\text{mol})$$
$$= (i/193000) \text{ mol}$$
$$= (i/193000) \times 22400 \text{ ml}$$

Accordingly, the flow rate of hydrogen (S) per unit time (one minute) is expressed by the following equation (4):

$$S = (i/193000) \times 22400 \times 60 \quad (4)$$

Additional features and advantages of the present invention are described in, and will be apparent from, the following Detailed Description of the Invention and the figures.

DETAILED DESCRIPTION OF THE INVENTION

The present invention relates generally to electrochemical systems. More specifically, the systems of the present invention employ hydrogen-powered fuel cells. In this regard, the present invention can provide electrochemical hydrogen flow rate control systems operable even in a non-humidified atmosphere and at room temperature. The systems of the present invention are light-weight, compact and less complex in design.

Figure 1:
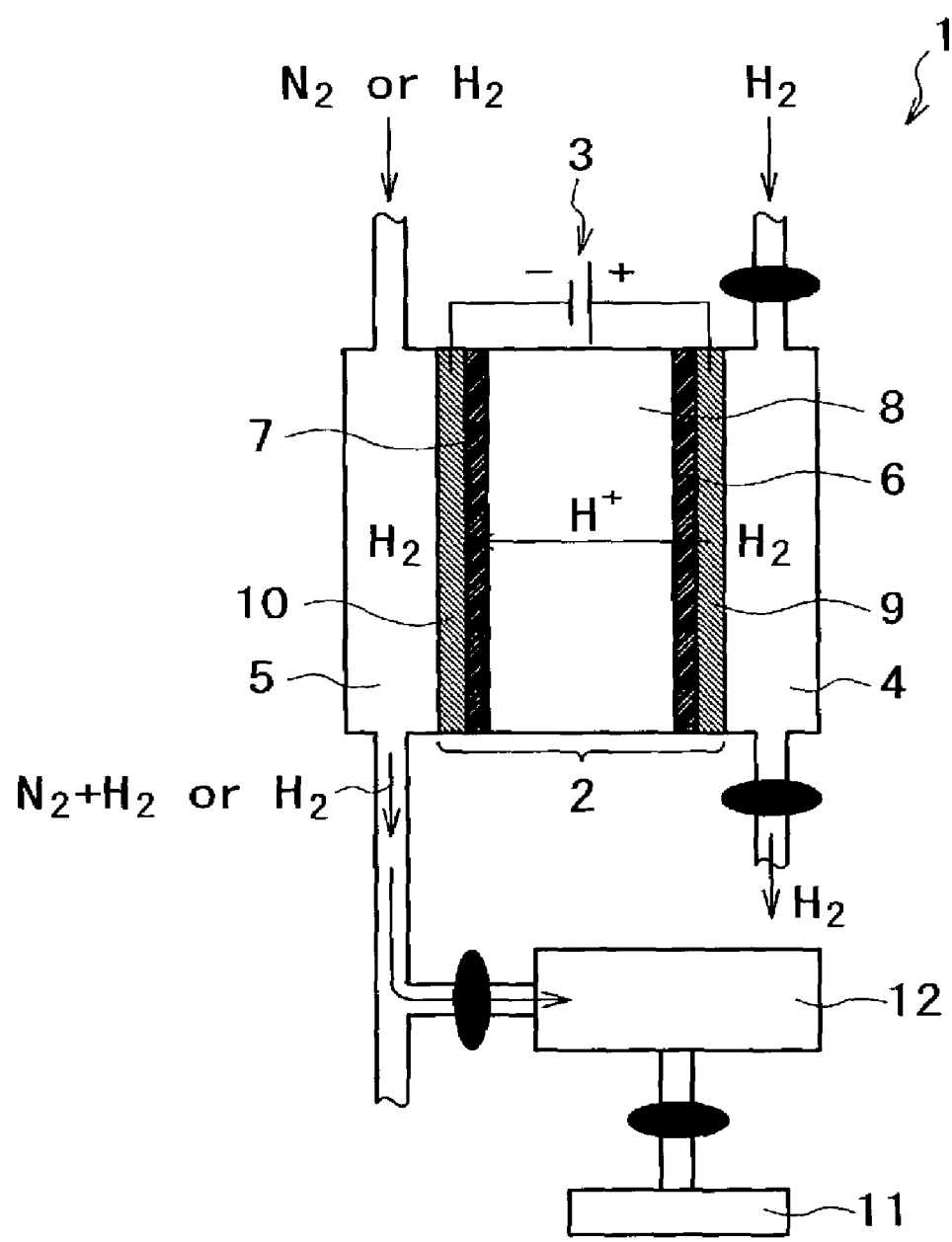
FIG. 1 is a schematic sectional view of an electrochemical hydrogen flow rate control system according to an embodiment of the present invention.

FIG. 1 is a schematic sectional view of an electrochemical hydrogen flow rate control system of an embodiment of the present invention. An electrochemical hydrogen flow rate control system 1 of the present invention has an electrochemical cell 2, a hydrogen flow rate control unit 3, and gas flow passages 4 and 5 as shown in FIG. 1.

The electrochemical cell 2 includes a gas diffusive anode electrode 6 as a first electrode on which a catalyst such as platinum or the like is supported, a gas diffusive cathode electrode 7 as a second electrode on which a catalyst such as platinum or the like is supported, a proton conductive solid electrolyte membrane 8 held between both the electrodes 6 and 7, a metal current collector 9 disposed on the anode 6 side, and a metal current collector 10 disposed on the cathode 7 side. The electrochemical cell 2, therefore, has a multi-layer structure, called "MEA (Membrane and Electrode Assembly) structure", in which the proton conductive solid electrolyte membrane 8 is held between the anode 6 and the cathode 7.

The electrochemical cell 2 having the multi-layer structure (MEA structure) of the proton conductive solid electrolyte membrane 8 and the gas diffusive electrodes 6 and 7 can be produced as follows. The proton conductive solid electrolyte membrane 8 is formed by impregnating a porous membrane with a proton conductive solid electrolyte composed of a fullerene derivative or by mixing the proton conductive solid electrolyte with a binder; the gas diffusive electrodes 6 and 7, on each of which the catalyst is supported, are stacked on both surfaces of the proton conductive solid electrolyte membrane 8; and the proton conductive solid electrolyte membrane 8 and the gas diffusive electrodes 6 and 7 thus stacked are pressed to each other. The area of the electrochemical cell 2 having the MEA structure thus produced is typically set to 12 $cm^2$.

The proton conductive solid electrolyte membrane 8 is made from a fullerene derivative obtained by introducing proton dissociative groups to carbon atoms of fullerene molecules. The membrane 8 has a thickness of, for example, about 0.03 mm. To increase the efficiency of electrochemical decomposition of hydrogen and hence to improve the proton generation efficiency, a catalyst layer is preferably provided on each of both surfaces of the proton conductive solid electrolyte membrane 8.

Each of the gas diffusive electrodes 6 and 7 is preferable to have a good heat resistance and a surface area being as large as possible. This allows the electrodes to be arranged in close-contact with the proton conductive solid electrolyte membrane 8 via the catalyst supported on the gas diffusive electrode, to be somewhat flexible for facilitating the close-contact of the gas diffusive electrode with the proton conductive solid electrolyte membrane 8, and to act as an activated electrode.

Accordingly, each of the anode 6 and the cathode 7 is preferably formed into a porous or mesh-like sheet. In particular, each of the anode 6 and the cathode 7 can be produced by forming a sheet made from carbon fibers or a porous carbon material and supporting an active catalyst on the side, which is to be brought into close-contact with the proton conductive electrolyte membrane 8, of the sheet. A web formed by knitting metal wires may be inserted or stuck as a core material in or on such a sheet-like electrode. With this configuration, it is possible to improve the electric conductivity of the electrode, and hence to equalize the current distribution over the entire surface of the electrode.

The catalyst is preferably a material in the form of fine particles such as platinum, ruthenium oxide, iridium oxide or the like. Another electrode material, such as silver, may be used as the catalyst insofar as it allows the progress of the reaction specified in the present invention.

The catalyst may be supported on each of the gas diffusive electrodes 6 and 7 by known methods. In an embodiment, the above-described catalyst material or a precursor thereof is supported on the surface of particles of carbon, followed by heating, to form catalyst particles, and the catalyst particles are stuck or immobilized, together with a fluorocarbon resin, on the surface of an electrode by baking.

In an embodiment, an electrode body having no catalyst material supported thereon is previously formed, and the surface of the electrode body is coated with a water solution or a butyl alcohol solution of a mixture of precursors of the catalyst materials, for example, chloroplatinic acid and chlororuthenic acid, followed by baking at a temperature of about 200° C. to about 350° C. in a reducing atmosphere containing hydrogen, to form an alloy containing platinum and ruthenium on the surface of the electrode body.

The electrochemical cell 2 may be formed by alternately stacking the proton conductive solid electrolyte membranes 8 and the gas diffusive electrodes 6 and 7 into one body. With this configuration, it is possible to readily increase the hydrogen generation efficiency.

The hydrogen flow rate control unit 3 is adapted to control the amount of hydrogen generated on the cathode 7 side by supplying a specific amount of current between the anode 6 and the cathode 7, thereby generating protons in an amount corresponding to the specific amount of current on the anode 6 side. It is to be noted that the hydrogen flow rate control unit 3, which controls a current flowing between the electrodes 6 and 7, may be of any control type insofar as it is a variable constant current power source capable of freely changing a current value.

The operation of the electrochemical hydrogen flow rate control system 1 of the present invention will be described below in greater detail according to an embodiment of the present invention. When a voltage is applied to the proton conductive solid electrolyte membrane 8, hydrogen gas supplied to the gas flow passage 4 on the anode 6 side is dissociated into protons on the anode 6. The protons migrate through the proton conductive solid electrolyte membrane 8 in the direction reversed to the voltage applying direction, and are converted again into hydrogen gas on the surface of the proton conductive solid electrolyte membrane 8 on the cathode 7 side. The hydrogen gas thus converted flows in the gas flow passage 5 on the cathode 7 side. Since a specific amount of nitrogen gas or hydrogen gas is supplied in the gas flow passage 5 on the cathode 7 side, the hydrogen gas generated on the cathode 7 side flows, together with the nitrogen gas or hydrogen gas, to a gas chromatograph 12 provided in the gas flow passage 5 on the cathode 7 side by a suction pump 11, to be subjected to quantitative analysis by the gas chromatograph 12.

The amount of the hydrogen thus generated is determined by the amount of the current flowing through the proton conductive solid electrolyte membrane 8, and the amount of the current is expressed by the equation (3). Accordingly, the generated amount (flow rate) of the hydrogen gas can be controlled by controlling the amount of the current flowing through the proton conductive solid electrolyte membrane 8 by the hydrogen flow rate control unit 3.

The mechanism of generating hydrogen gas will be described below in greater detail according to an embodiment of the present invention. The hydrogen gas supplied to the hydrogen gas flow passage 4 on the anode 6 side loses electrons on the gas diffusive electrode 6, to generate protons in accordance with the reaction expressed by the following formula (5):

$$H_2 \rightarrow 2e^- + 2H^+ \tag{5}$$

The protons generated on the anode 6 side migrate to the gas diffusive electrode 7 through the proton conductive solid electrolyte membrane 8 by a drive force given by a voltage, and receive electrons on the gas diffusive electrode 7 to be converted again into hydrogen gas by the reaction expressed by the following formula (6):

$$2H^+ + 2e^- \rightarrow H_2 \tag{6}$$

A temperature desirable for this reaction ranges about −50° C. to about 300° C., preferably about −40° C. to about 160° C.

The hydrogen gas generated on the gas diffusive electrode 7 cannot pass through the proton conductive solid electrolyte membrane 8. The migration force of ions given by the voltage is large.

The metal current collectors 9 and 10 function to apply a voltage between the gas diffusive electrodes 6 and 7, and also function to mechanically reinforce the gas diffusive electrodes 6 and 7 and the proton conductive solid electrolyte membrane 8. The material of each of the metal current collectors 9 and 10 is not particularly limited but is preferably a metal having an effective heat resistance and an effective corrosion resistance. For example, a titanium mesh, the surface of which is covered with a conductive oxide having a stable electric conductivity, such as ruthenium oxide, is preferably used as each of the metal current collectors 9 and 10 according to an embodiment of the present invention.

According to the electrochemical hydrogen flow rate control system 1 of an embodiment of the present invention, the proton conductive solid electrolyte membrane 8 is made from a fullerene derivative obtained by introducing proton dissociative groups to carbon atoms of fullerene molecules and the system 1 has the hydrogen flow rate control unit 3. Accordingly, at the time of operating the system 1, the system 1 does not require a supplement of moisture unlike known systems that use, for example, the solid polymer proton conductive membrane such as NAFION, and therefore, even in a dry atmosphere and at room temperature, the system 1 can accurately control the flow rate of hydrogen gas due to the good proton conductivity of the proton conductive solid electrolyte membrane 8. As a result, the system 1 can eliminate the need a humidifier or the like, and thus can be configured as a lightweight and compact system.

Since the system 1 can be operated in a dry atmosphere without the need of any humidification, it is possible to prolong the service life of the proton conductive solid electrolyte membrane 8 made from the fullerene derivative.

In addition to the advantage associated with elimination of the need of any humidification, the control system is further advantageous in that since the hydrogen gas generated on the cathode 7 side contains little moisture, it is possible to easily and accurately control the generated amount of hydrogen gas by the hydrogen flow rate control unit 3.

According to the system of an embodiment of the present invention, since the proton conductive solid electrolyte membrane 8 made from the fullerene derivative operable even in a non-humidified atmosphere is used, hydrogen gas can be generated by supplying air in the gas flow passage 4 on the anode 6 side of the electrochemical cell 2 and applying a voltage equal to or more than a water electrolyzing voltage 1.23 V, to decompose a water vapor component contained in air, and the flow rate of the hydrogen gas can be controlled. In this case, the reactions expressed by the following formulas (7) and (8) occur on the anode 6 side and the cathode 7 side.

Anode Reaction:

$$H_2O \rightarrow 2H^+ + 1/2O_2 + 2e^- (1.23\ V) \tag{7}$$

Cathode Reaction:

$$2H^+ + 2e^- \rightarrow H_2 (0.0\ V) \tag{8}$$

Total:

$$H_2O \rightarrow H_2 + 1/2O_2$$

It is to be noted that although the theoretical electrolyzing voltage is 1.23 V, an actual electrolyzing voltage becomes a value in a range of about 1.5 V to about 2 V because an electrolyzing over-voltage component and an electric resistance are added to the theoretical electrolyzing voltage. In this regard, present invention provides a lightweight and compact electrochemical hydrogen flow rate control system having a function of generating a hydrogen gas by electrolysis of water and effectively controlling the flow rate of the hydrogen gas.

The hydrogen flow rate control unit 3 may have a removably mounting structure. In a state that the hydrogen flow rate control unit 3 remains as removed from the system 1, the system 1 is usable as a fuel cell. In this case, oxygen gas may be supplied in the gas flow passage 5 on the cathode 7 side in place of the nitrogen gas or hydrogen gas.

The type of the fullerene molecules as the base material to which the proton dissociative groups are to be introduced is not particularly limited insofar as it is a type of spherical shell-like cluster molecules expressed by a molecular formula $C_m$ (m is a natural number allowing $C_m$ to form a spherical shell-like structure), and in general, may be one type, such as $C_{36}$, $C_{60}$, $C_{70}$, $C_{76}$, $C_{78}$, $C_{80}$, $C_{82}$, $C_{84}$, $C_{86}$, $C_{88}$, $C_{90}$, $C_{92}$, $C_{94}$, and $C_{96}$. These types of fullerene molecules may be used singly or in combination.

These fullerene molecules were found in the mass spectrum of a beam of a carbon cluster created by laser abrasion of graphite in 1985 (see Kroto, H. W.; Heath, J. R.; O'Brien, S. C.; Curl, R. F.; Smalley, R. E., Nature 1985, 318, 162). The method of producing the fullerene molecules by arc discharge of a carbon electrode was established about five years later. Ever since, the fullerene molecules have become a focus of attention as a carbon-based semiconductor material or the like.

Figure 2B:
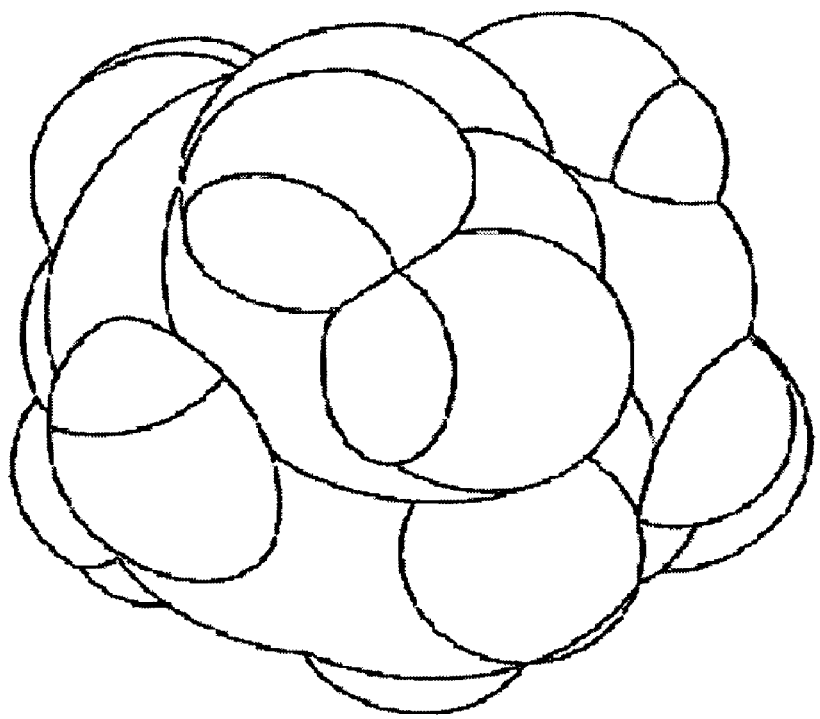
FIGS. 2A and 2B are views showing the structure of a polyhydroxylated fullerene as an illustrative example of a fullerene derivative according to an embodiment of the present invention.
Figure 2A:
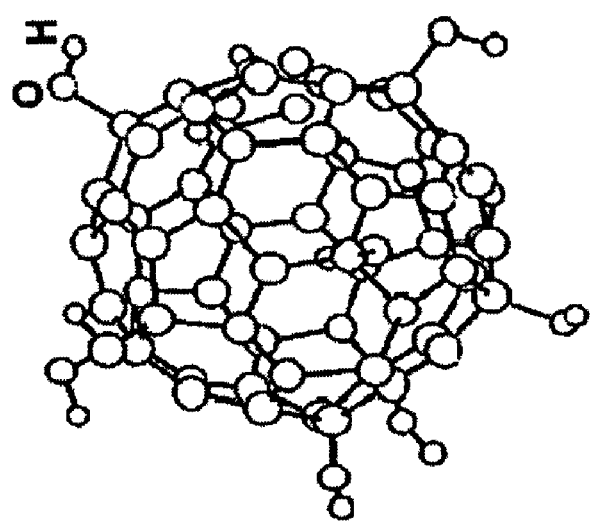

A synthesis example of a fullerenol having a structure that a plurality of hydroxyl groups are introduced to fullerene molecules as shown in FIGS. 2A and 2B was first reported by Chiang, et al. in 1992 (see Chiang, L. Y.; Swirczewski, J.

W.; Hsu, C. S.; Chowdhury, S. K.; Cameron, S.; Creegan, K., J. Chem. Soc., Chem. Commun., 1992, 1791).

Figure 3A:
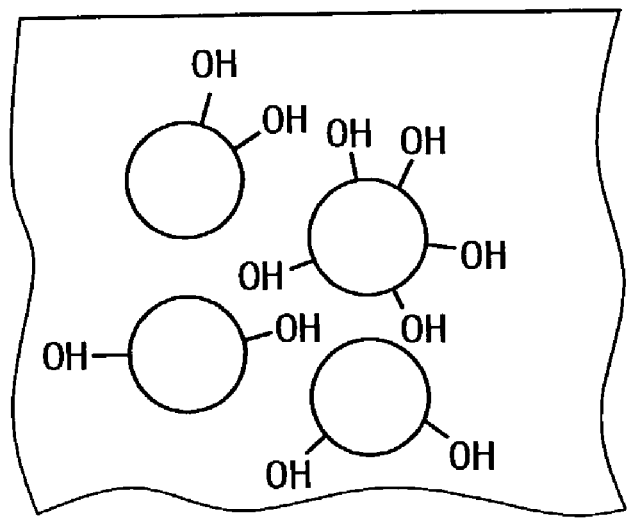
FIGS. 3A and 3B are views showing examples of other fullerene derivatives according to an embodiment of the present invention.

As schematically shown in FIG. 3A, the fullerenol molecules may be aggregated so as to cause interaction among hydroxyl groups of the fullerenol molecules close to each other. In FIG. 3A, the fullerene molecule is denoted by the mark ○. Such an aggregate exhibits a high proton conductive characteristic (that is, a high dissociative characteristic of $H^+$ from the phenolic hydroxyl groups of the fullerenol molecules) as a whole.

Figure 3B:
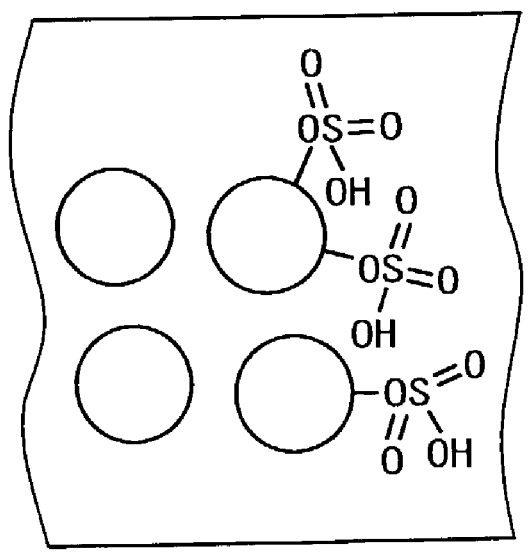

According to an embodiment, in addition to the aggregate of the fullerenol molecules, an aggregate of molecules of another fullerene derivative containing, for example, a plurality of —$OSO_3H$ groups can be used as the material of the proton conductive solid electrolyte membrane. A polyhydroxylated fullerene shown in FIG. 3B, that is, a hydrogensulfate esterified fullerenol containing $OSO_3H$ groups replaced from OH groups was also reported by Chiang et al. in 1994 (see Chiang, L. Y.; Wang, L. Y.; Swirczewski, J. W.; Soled, S.; Cameron, S., J. Org. Chem. 1994, 59, 3960). The hydrogensulfate esterified fullerene may contain only the $OSO_3H$ groups in one molecule or contain one or more $OSO_3H$ groups in addition to one or more OH groups in one molecule.

An aggregate of a large number of the above-described hydroxylated fullerenol molecules or hydrogensulfate esterified fullerenol molecules can be continuously used even in a dry atmosphere because the proton conductivity as a bulk property is directly dependent on migration of protons originated from a large amount of the OH groups or $OSO_3H$ groups contained in the molecules. Not only the $OSO_3H$ groups having a high acidity but also the OH groups greatly contribute to promotion of ionization of hydrogen. The reason for this may be considered to be due to the fact that the fullerene molecules as the bases of these fullerenol molecules have an electrophilic property. As a result, the fullerenol containing the OH groups or the $OSO_3H$ groups can exhibit effective proton conductivity. Also, since a large number of the OH groups and/or the $OSO_3H$ groups can be introduced in one fullerene molecule, the number density of the protons contributing to conduction per unit volume of the conductor becomes large, to substantially increase the conductivity.

Since the hydroxylated fullerenol or the hydrogensulfate esterified fullerenol is mostly composed of carbon atoms of fullerene molecules, such a fullerenol is lightweight and is less deteriorated, and is effectively free of contaminants. The production cost of fullerenes has been rapidly dropped. From the viewpoints of resource, environment, and economy, the fullerene may be considered as an ideal carbon based material as compared with other materials.

The proton dissociative group is not limited to the above-described OH group or $OSO_3H$ group. The dissociative group may be a group expressed by a molecular formula —XH where X denotes a given atom or atomic group having a bivalent bond, and also may be a group expressed by a molecular formula —OH or —YOH where Y is a given atom or atomic group having a bivalent bond. More specifically, the proton dissociative group can include —OH, —$OSO_3H$, —COOH, —$SO_3H$, —$OPO(OH)_2$, —$C_6H_4$—$SO_3H$, the like and combinations thereof according to an embodiment of the present invention.

The above-described fullerenol usable in the present invention can be synthesized by subjecting a powder of fullerene molecules to a combination of known treatments such as acidification and hydrolysis, to introduce desired groups to carbon atoms of the fullerene molecules.

The fullerene derivative (fullerenol) thus obtained may be formed into a membrane by a coating process or a vapor deposition process. Such a membrane-like fullerene derivative is usable as the material of the proton conductive solid electrolyte membrane of the electrochemical cell. The proton conductive solid electrolyte membrane may be a membrane being substantially composed of only a fullerene derivative, or a membrane composed of the fullerene derivative bound by a binder.

In the case where the proton conductive solid electrolyte membrane is a membrane that is substantially composed of a fullerene derivative, the fullerene derivative may be formed into a membrane by pressing. In the case where the proton conductive solid electrolyte membrane is a membrane composed of a fullerene derivative bound by a binder, the strength of the proton conductive solid electrolyte membrane can be sufficiently increased by the binder.

One, two or more types of known polymers that exhibit effective film forming characteristics may be used as the binder. The proton conductive solid electrolyte membrane made from a fullerene derivative bound by a binder can exhibit the same proton conductivity as that of the proton conductive solid electrolyte membrane made from the fullerene derivative.

As compared with the membrane of only a fullerene derivative formed by pressing a powder of the fullerene derivative, the membrane of the fullerene derivative bound by a polymer as the binder is advantageous in that the membrane formability is provided by the polymer, and thereby it can be used as a flexible proton conductive membrane (thickness: usually, in a range of about 300 μm or less) having a high strength and a effective gas impermeability.

The polymer used as the binder is not particularly limited insofar as it does not obstruct the proton conductivity (due to the reaction with a fullerene derivative) as much as possible and it has effective film forming properties. In general, a polymer having no electron conductivity and having a good stability is used as the binder, examples of which include polytetrafluoroethylene, polyvinylidene fluoride, polyvinyl alcohol, the like and combinations thereof. These polymers are preferable for the reasons described in detail below.

As compared with other polymers, polytetrafluoroethylene is advantageous in that a fullerene derivative containing polytetrafluoroethylene can be easily formed into a membrane having a high strength even if the added amount of polytetrafluoroethylene is small. The added amount of polytetrafluoroethylene may be in a range of about 3 wt % or less, preferably, about 0.5 to about 1.5 wt %. The thickness of the membrane thus formed can be generally reduced to a value ranging from about 100 μm to about 1 μm.

Each of polyvinylidene fluoride and polyvinyl alcohol is advantageous in that a fullerene derivative containing polyvinylidene fluoride or polyvinyl alcohol can be formed into a proton conductive membrane having a good gas impermeability. The added amount of each of polyvinylidene fluoride and polyvinyl alcohol may be in a range of about 5 to about 15 wt %.

If the added amount of each of polytetrafluoroethylene, polyvinylidene fluoride, and polyvinyl alcohol is lower than the lower limit of the above-described range, a fullerene derivative containing such a polymer fails to ensure the effective membrane formability.

In the case of using the binder for forming the proton conductive solid electrolyte membrane in an embodiment, a fullerene derivative containing the binder may be formed into the membrane by a known membrane forming process such as a pressing process, an extrusion process or other suitable process.

From the viewpoints of handling and size, the system of an embodiment of the present invention is preferably configured such that the gas diffusive electrodes and a fullerene derivative as the material of the proton conductive solid electrolyte membrane are formed into a flexible sheet having a sufficient physical strength. Since the electrochemical cell can be desirably operated in atmospheric air, it is possible to efficiently generate hydrogen gas and control the flow rate of the hydrogen without the need of adjustment of the temperature, humidity and the like at the time of operating the system.

According to an embodiment of the present invention, since the fullerene derivative, such as a fullerenol, obtained by introducing the above-described proton dissociative groups to carbon atoms of the fullerene molecules is used as the material of the proton conductive electrolyte solid electrolyte membrane, the control system can eliminate the need of provision of a humidifier or the like unlike the related art system using the $H_3O^+$ ion conductor (NAFION), and therefore, it can be operated even in a dry atmosphere, to prolong the service life of the proton conductive solid electrolyte membrane.

In the case of the system using the $H_3O^+$ ion conductor (NAFION), since moisture is generated along with the generation of hydrogen gas, the system is required to be provided with a dehumidifier. According to an embodiment of the present invention, since the generated hydrogen does not contain moisture, it is possible to generate hydrogen gas and accurately control the flow rate of the hydrogen gas without the need of provision of any dehumidifier.

The present invention will be described below with reference to the following examples illustrative of an embodiment of the present invention:

EXAMPLE 1

First, the above-described proton conductive solid electrolyte membrane was formed by using the above-described fullerene derivative, to fabricate the electrochemical hydrogen flow rate control system 1 shown in FIG. 1.

The control system 1 was placed in a dry atmosphere and at room temperature. Nitrogen gas was supplied in the gas flow passage 5 on the cathode 7 side, to replace the atmosphere in the gas flow passage 5 with the nitrogen gas. Hydrogen gas was supplied on the surface of the anode 6 via the gas flow passage 4 on the anode 6 side at a flow rate of about 50 ml/min and a current in a range of about 0 A to about 1 A was applied between both the electrodes 6 and 7. The supplied hydrogen gas was dissociated into protons on the anode 6 side. The protons were made to pass through the fullerene based proton conductive solid electrolyte membrane 8, and were converted again into hydrogen gas on the cathode 7 side. The hydrogen gas thus converted was discharged in the nitrogen gas in the gas flow passage 5 on the cathode 7 side. At this time, a change in partial pressure of hydrogen contained in the nitrogen gas in the gas flow passage 5 on the cathode 7 side was measured by using a gas chromatograph 12. The result is shown in FIG. 4.

Figure 4:
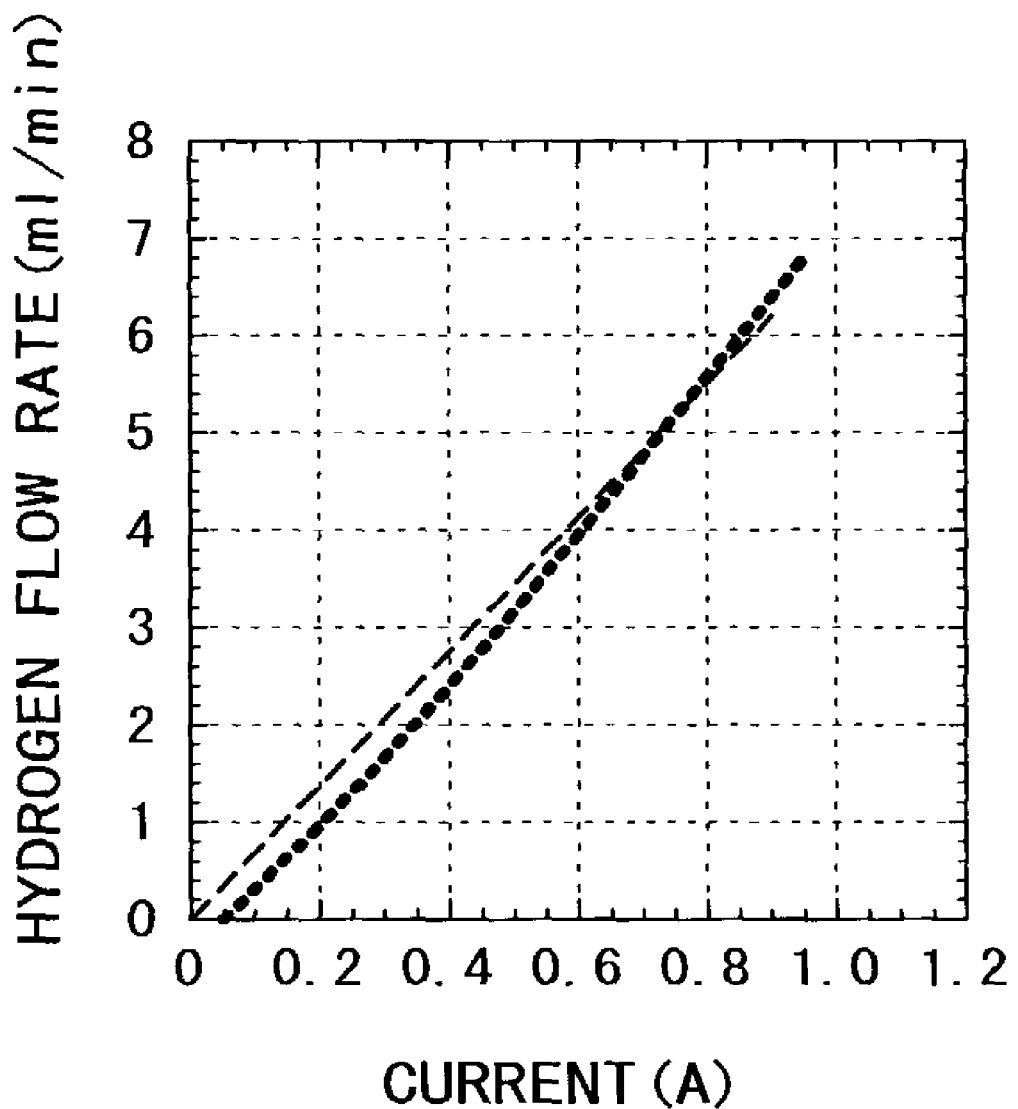
FIG. 4 is a graph showing a relationship between a current and a hydrogen partial pressure according to an embodiment of the present invention.

As illustrated in FIG. 4, the rising rate of the partial pressure of hydrogen is proportional to the applied current which ranges of about 0 A to about 1 A. Assuming that the current that flows through the proton conductive solid electrolyte membrane 8 is all or substantially all due to migration of the protons, a theoretical value of the amount of the protons having passed through the proton conductive solid electrolyte membrane 8 can be calculated on the basis of the amount of the current having flown in the proton conductive solid electrolyte membrane 8. As a result, the theoretical molar amount (m) of the generated hydrogen gas is calculated by integral of a current I and a time t on the basis of Farady's law as shown in the following equation (9).

$$m=(I \times t)/2F \qquad (9)$$

where m is a theoretical molar amount of hydrogen gas, I is a current, t is a time, and F is the Farady constant.

As a result of comparison of the actual measured value of the mount of hydrogen gas with the theoretical value of the amount of hydrogen gas calculated on the basis of the equation (9), it became apparent that the fullerene based proton conductive solid electrolyte membrane 8 produced in this example has a current efficiency nearly equal to 100%. In this regard, the actual measured value of the amount of the protons having passed through the fullerene based proton conductive solid electrolyte membrane 8 nearly or substantially corresponds to the theoretical value of the amount of the protons having passed through the membrane 8 calculated from the current value.

EXAMPLE 2

First, the above-described proton conductive solid electrolyte membrane was formed by using the above-described fullerene derivative, to fabricate the electrochemical hydrogen flow rate control system 1 shown in FIG. 1.

The control system was placed in a dry atmosphere and at room temperature. Nitrogen gas was supplied in the gas flow passages 4 and 5 on the anode 6 side and the cathode 7 side, to replace the atmospheres in the gas flow passages 4 and 5 with the nitrogen gas. Hydrogen gas was supplied to the surface of the anode 6 via the gas flow passage 4 on the anode 6 side at a flow rate of about 50 ml/min, and a current of about 0.2 A was supplied between both the electrodes 6 and 7. The changes in concentrations of hydrogen gas, nitrogen gas, and moisture on the cathode 7 side were measured. At this time, the applied voltage was kept constant.

Figure 5:
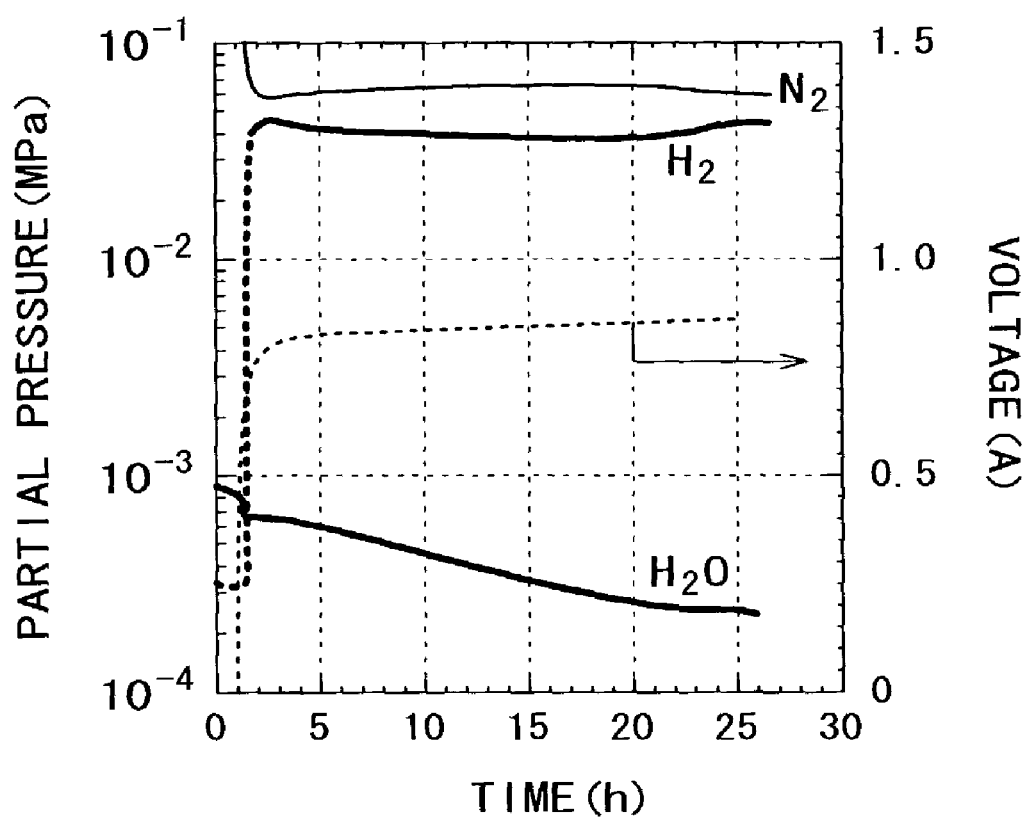
FIG. 5 is a graph showing changes in concentrations of hydrogen gas, nitrogen gas, and moisture with elapsed time according to an embodiment of the present invention.
Figure 6:
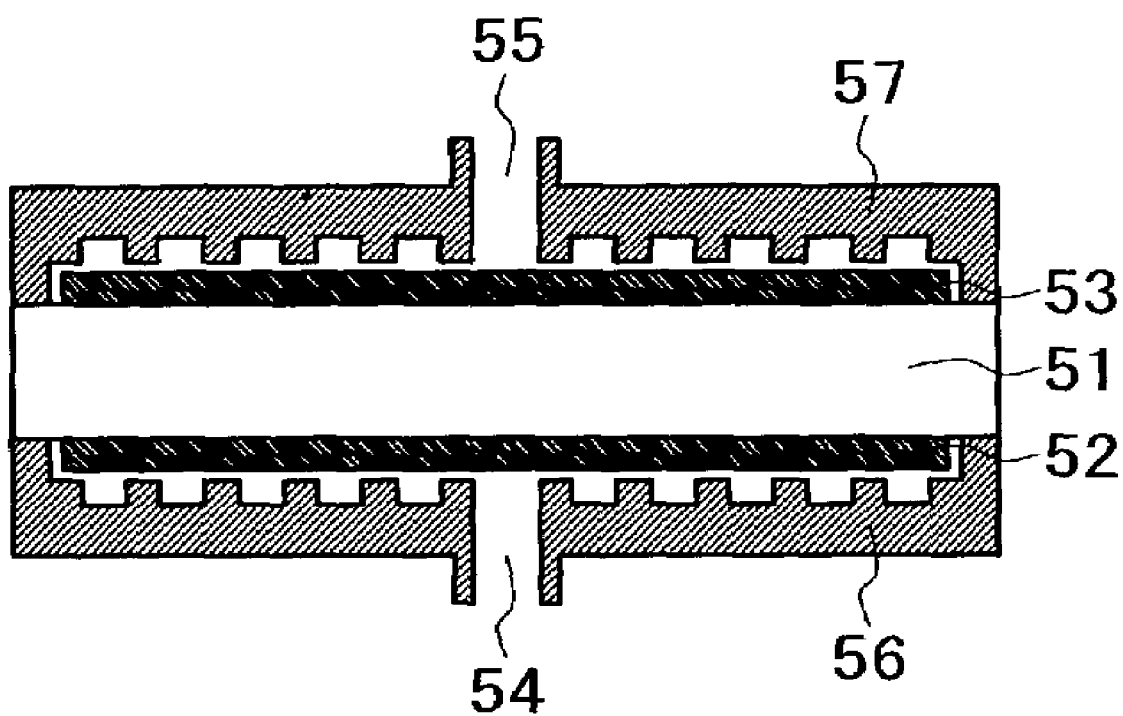
FIG. 6 is a schematic sectional view of a related art hydrogen flow rate control system.

As is apparent from FIG. 5, the ratio of the amount of moisture to the amount of the hydrogen gas generated on the cathode 7 side was about 0.1% or less after 24 hours.

As described above, according to the electrochemical hydrogen flow rate control system 1 of an embodiment the present invention, since the amount of the hydrogen gas generated on the cathode 7 side is determined on the basis of the amount of the current flowing in the proton conductive solid electrolyte membrane 8, which current amount is expressed by the equation (3), the generated amount (flow rate) of the hydrogen gas can be controlled by controlling the amount of the current flowing in the proton conductive solid electrolyte membrane 8 by using the hydrogen flow rate control unit 3.

According to the control system 1 of an embodiment of the present invention, the proton conductive solid electrolyte membrane 8 is made from the fullerene derivative obtained by introducing proton dissociative groups to carbon atoms of fullerene molecules and the system 1 has the hydrogen flow rate control unit 3. Accordingly, at the time of operating the system 1, the system 1 does not require a supplement of moisture unlike the known systems that use the solid polymer proton conductive membrane, such as NAFION, and therefore, even in a dry atmosphere and at room temperature, the system 1 can accurately control the flow rate of hydrogen gas due to the good proton conductivity of the proton conductive solid electrolyte membrane 8. As a result, the system 1 can eliminate the need of provision of the above-described humidifier, and can be configured as a lightweight and compact system.

Since the system 1 can be operated in a dry atmosphere without the need of any humidification, it is possible to prolong the service life of the proton conductive solid electrolyte membrane 8 made from the fullerene derivative. In addition to the advantage associated with elimination of the need of any humidification, the system 1 is also advantageous in that since the hydrogen gas generated on the cathode 7 side contains little moisture, it is possible to easily and accurately control the generated amount of hydrogen gas by the hydrogen flow rate control unit 3.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An electrochemical hydrogen flow rate control system comprising:
   a hydrogen gas supply;
   an electrochemical cell including a first electrode for generating protons from the hydrogen gas supply, said first electrode on a first side of the electrochemical cell, a second electrode for converting the protons generated by said first electrode into hydrogen gas on a second side of the electrochemical cell, and a proton conductive solid electrolyte membrane fixed between the first and second electrodes; and
   a hydrogen flow rate control unit for generating a specific molar flow rate of hydrogen gas on the second side of the electrochemical cell, wherein a first partial pressure of the hydrogen gas supply on the first electrode is approximately equal to a second partial pressure of the hydrogen gas generated on the second side of the electrochemical cell, wherein the proton conductive solid electrolyte membrane includes a fullerene derivative composed of one or more fullerene molecules with carbon atoms having one or more proton dissociative groups introduced thereto.

2. The system according to claim 1, wherein the hydrogen gas supply is supplied to a surface side, not provided with said proton conductive solid electrolyte membrane, of the first electrode, and a specific amount of current is applied between the first and second electrodes by said hydrogen flow rate control unit allowing the hydrogen gas to be electrolyzed into the protons in an amount corresponding to the specific amount of current on the first electrode side such that the protons are capable of migrating to the second electrode through the proton conductive solid electrolyte membrane and are converted again into hydrogen gas on the second electrode side, thus obtaining a specific molar flow rate of the hydrogen gas on the second electrode side.

3. The system according to claim 1, wherein the electrochemical cell includes a membrane-electrode assembly having a multi-layer structure that includes the first and second electrodes, each of which are composed of a gas diffusive electrode having a catalyst supported thereon wherein the electrodes are disposed on both sides of the proton conductive solid electrolyte membrane.

4. The system according to claim 3, wherein the proton conductive solid electrolyte membrane and the gas diffusive electrodes are alternately stacked thereby defining a single body.

5. The system according to claim 1, wherein the hydrogen flow rate control unit is removably mounted to the electrochemical hydrogen flow rate control system.

6. The system according to claim 1, wherein the proton dissociative group includes a chemical group expressed by a molecular formula —XH where X an atom or a group of atoms having a bivalent bond, and H is a hydrogen atom.

7. The system according to claim 6, wherein the proton dissociative group is a chemical group expressed by a molecular formula selected from the group consisting of —OH and —YOH where Y is an atom or group of atoms having a bivalent bond.

8. The system according to claim 7, wherein the proton dissociative group is selected from the group consisting of —OH, —OSO$_3$H, —COOH, —SO$_3$H, —OPO(OH)$_2$, and —C$_6$H$_4$—SO$_3$H.

9. The system according to claim 1, wherein the fullerene molecules are spherical shell-like cluster molecules expressed by a molecular formula C$_m$ where m is a natural number allowing C$_m$ to form a spherical shell structure.

10. The system according to claim 1, wherein the first partial pressure of the hydrogen supply on the first electrode is about 1 atm and the second partial pressure of the hydrogen gas generated on the second side is about 1 atm.

* * * * *